United States Patent
Pickell (10) Patent No.: US 7,222,256 B2
(45) Date of Patent: May 22, 2007

(54) SYSTEM AND METHOD FOR CONTROLLING REDUNDANT COMMUNICATION LINKS IN NETWORKED SAFETY SYSTEMS

(75) Inventor: John D. Pickell, Roselle, IL (US)

(73) Assignee: Honeywell International Inc., Morristown, NJ (US)

( * ) Notice: Subject to any disclaimer, the term of this patent is extended or adjusted under 35 U.S.C. 154(b) by 365 days.

(21) Appl. No.: 10/335,596

(22) Filed: Dec. 31, 2002

(65) Prior Publication Data

US 2004/0153701 A1   Aug. 5, 2004

(51) Int. Cl.
*G06F 11/00* (2006.01)
(52) U.S. Cl. ............... 714/4; 709/223; 709/224
(58) Field of Classification Search ............ 714/4; 340/287; 709/223, 224
See application file for complete search history.

(56) References Cited

U.S. PATENT DOCUMENTS

| | | | | |
|---|---|---|---|---|
| 5,488,723 A | * | 1/1996 | Baradel et al. | 719/315 |
| 6,311,288 B1 | * | 10/2001 | Heeren et al. | 714/4 |
| 6,496,949 B1 | * | 12/2002 | Kanevsky et al. | 714/47 |
| 6,714,977 B1 | * | 3/2004 | Fowler et al. | 709/224 |
| 6,718,383 B1 | * | 4/2004 | Hebert | 709/224 |
| 6,829,513 B2 | * | 12/2004 | Piersanti et al. | 700/83 |

OTHER PUBLICATIONS

"Ethernet" "DCD" "DTR" "Hub" "RS-232" "Serial Port". Microsoft Computer Dictionary (Fifth Edition).2002. Microsoft Press.*
Printed from internet Dec. 7, 2002, Shore Microsystems SM-2501 Link Protector (http://www.shoremicro.com/sm-2501.htm).
Printed from internet Apr. 16, 2003, Lantronix®, UDS-10 Device Servers™ (http://www.lantronix.com/products/ds/uds10/).

* cited by examiner

*Primary Examiner*—Robert Beausoliel
*Assistant Examiner*—Matt Urick (57) ABSTRACT

A system, apparatus, and method for maintaining communication integrity in a safety system. A link integrity signal indicative of any short circuits or open circuits in a first communication link is communicated. A control signal having characteristics corresponding to the communication state of the first communication link is generated. A communication link switch is coupled to the first communication link and one or more second communication links; this link switch being controlled in response to the control signal characteristics. If the control signal characteristics indicate that a failure affecting any one or more signals associated with the first communication link has occurred, the connection is switched to one of the second communication links.

46 Claims, 7 Drawing Sheets

SYSTEM AND METHOD FOR CONTROLLING REDUNDANT COMMUNICATION LINKS IN NETWORKED SAFETY SYSTEMS

FIELD OF THE INVENTION

This invention relates in general to networked safety systems, and more particularly to a system, apparatus, and method for monitoring and controlling selection of redundant LAN communication links in response to total or limited failures of the active communication links in a networked safety system.

BACKGROUND OF THE INVENTION

Safety systems are used in a many different environments ranging from personal safety systems to wide-reaching, networked safety systems. Small scale safety systems include, for example, home security systems, smoke detectors, and the like. On a larger scale, buildings and campuses generally include safety and possibly security systems. For example, fire and smoke systems, access systems, security systems, etc. are all within the purview of building safety systems. Due to the size of buildings relative to single-family dwellings and the generally higher number of people that may be within the building at a given time, additional safety requirements are usually necessary. These additional safety requirements are driven by the desire to provide a safe and functional environment, and may also be driven by various safety regulations. Agencies such as the National Fire Protection Association (NFPA), Occupational Safety & Health Administration, etc. set forth requirements for certain safety systems, particularly fire safety systems. In addition to these regulatory requirements, certification of various aspects of a system may be obtained from other organizations, such as the Underwriters Laboratories Inc. (UL).

Specific components or devices used in fire safety systems may be individually UL-approved. For example, smoke detectors, heat sensors, alarm pull stations and other devices that form part of the collective fire alarm system may require UL approval. Vendors of such individual components may obtain the requisite UL approval. However, a system developer may be subject to system-level safety requirements, such as the interface between such components, control of the components, component redundancies, communication link redundancies, etc. In these cases, the system developer often seeks UL approval at the system level.

Today's networking technologies provide the system developer with great flexibility in monitoring and controlling fire systems. For example, monitoring and/or control of discrete detectors or groups of detectors may be accomplished at a central location, or such functions may be distributed over multiple locations. Monitoring and control may be performed through direct communication links, through Local Area Networks (LANs), and/or remotely. To facilitate aggregate monitoring and control of the various detectors and components used in the fire system, these detectors and components may be networked with a central processing system(s). In some cases, direct communication links may be sufficient, such as where a small number of detectors are utilized, and a central processing system can directly monitor and control such devices. At the other end of the spectrum, fire systems can be monitored and controlled via Wide Area Networks (WANs) or Global Area Networks (GANs) such as the Internet, where one or more central processing systems monitor and control devices at remote locations. A common implementation is a fire system located within a building or campus, where LANs are used to facilitate communication between the processing systems and the sensors, detectors, etc. System-level safety requirements may dictate the manner in which such systems operate via the LAN or other network. One such system-level requirement involves the integrity of communication links within the network environment of a fire safety system.

In the context of LANs, for example, various communication protocols and physical media may be used. For example, LANs may be established using different types of physical links, such as twisted-pair wires, coaxial cable, etc. Different communication protocols may be used to communicate over the physical links. As a particular example, one commonly implemented LAN implementation employs Ethernet technology. Ethernet technology and its analogous Institute of Electrical and Electronics Engineers, Inc. (IEEE) 802.3 standards are well known local area networking technologies. As previously indicated, system-level safety requirements may govern the manner in which LAN connections, such as Ethernet connections, are to be implemented in order to comply with safety regulations. For example, a requirement exists in some fire system applications that redundant communication paths be provided to monitor the integrity of the communication links associated with the LAN connection. One example of such a requirement is UL standard 864, which is a standard for control units for fire-protective signaling systems. This standard is based upon NFPA 72, the National Fire Alarm Code. This code explicitly describes the current requirements for redundant communication paths used in safety systems. Presently, there is no system that complies with this code for fire safety systems using redundant Ethernet (or analogous) LAN connections.

Accordingly, there is a need for a manner of providing reliable, redundant network communication links in safety systems such as fire safety systems. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses a system, apparatus and method for maintaining communication integrity in a safety system.

In accordance with one embodiment of the invention, a method is provided for maintaining communications on a safety system network connection. The method includes communicating a link integrity signal indicative of a communication state on a first network communication link. A control signal is generated that has characteristics corresponding to the communication state of the first network communication link. A communication link switch is coupled to the first network communication link and one or more second or "backup" network communication links, and this link switch is controlled in response to the control signal characteristics. Via the communication link switch, switching from the first network communication link to one of the second network communication links at the communication link switch is effected when the control signal characteristics indicate a failure affecting any one or more signals associated with the first network communication link. For example, if any two or more signals of the network communication link are shorted together, or any of the signals are open-circuited, the link integrity signal will be disrupted, and the control signal will be generated such that this condition may be used to ultimately control the communication link switch.

In accordance with another embodiment of the invention, a network interface for maintaining communication integrity with at least one central processor in a safety system is provided. The network interface includes a communication link redundancy module, which includes a controllable link switch for activating one of a plurality of selectable communication links between the communication link redundancy module and the central processor. A terminal server is coupled to the link switch to communicate with the central processor via the currently-activated communication link. The terminal server includes a link signal detector to monitor a link signal indicative of a communication state of the activated communication link and to generate a control signal in response to the link signal. An interface circuit is coupled to the terminal server to receive the control signal, and to generate a command to the controllable link switch to select a different one of the plurality of selectable communication links when the control signal indicates a failure of any one or more signals associated with the currently-activated communication link.

In accordance with another embodiment of the invention, a safety system is provided. The safety system may include, for example, fire/smoke safety systems, security systems, access systems, and the like. The safety system includes one or more control panels, each control panel being coupled to any number of safety devices to control and/or monitor the safety devices. At least one central processing system is provided to, among other things, collect data from the one or more control panels. A network interface module is coupled to the control panels and the central processing system to facilitate communication between the control panels and the central processing system. The network interface module includes a communication link redundancy module which includes a controllable link switch for activating one of a plurality of selectable communication links between the communication link redundancy module and the central processor. A terminal server is provided with the network interface module, and is coupled to the link switch to communicate with the central processor via the currently-activated communication link. The terminal server includes a link signal detector to monitor a link signal indicative of a communication state of the activated communication link, and to generate a control signal in response. The network interface module further includes an interface circuit coupled to the terminal server to receive the control signal, and to generate a command to the controllable link switch to select a different one of the plurality of selectable communication links when the control signal indicates a failure of any one or more signals associated with the currently-activated communication link.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description, reference is made to the accompanying drawings which form a part hereof, and in which is shown by way of illustration particular embodiments in which the invention may be practiced. It is to be understood that other embodiments may be utilized, as structural and operational changes may be made without departing from the scope of the present invention.

Generally, the present invention provides a manner of controlling communication on a plurality of network communication links in a networked system, such as fire safety systems, access control systems, security systems, and other networked systems. One such networked safety system is the Honeywell LifeSafety Manager™, which provides monitoring and control of a building's (or group of buildings') life safety functions, such as smoke and fire detection, sprinkler supervision, emergency communications, etc. While functions associated with such a system can be performed via one or more control panels coupled to respective sensors and control circuits, operators can also monitor and control a portion or all of the system by way of one or more central processing systems that communicate with the various control panels, detectors, and other circuits by way of a network. Due to safety regulations as well as the overriding desire to maximize safety, redundancies and other fail-safe design considerations are often implemented to minimize the impact of failures in such a system, including redundancies in the network connections to these central processing systems. The present invention provides a manner of monitoring the integrity of communication links in such network connections, and in response, selecting an operable communication link among a plurality of available communication links.

Figure 1:
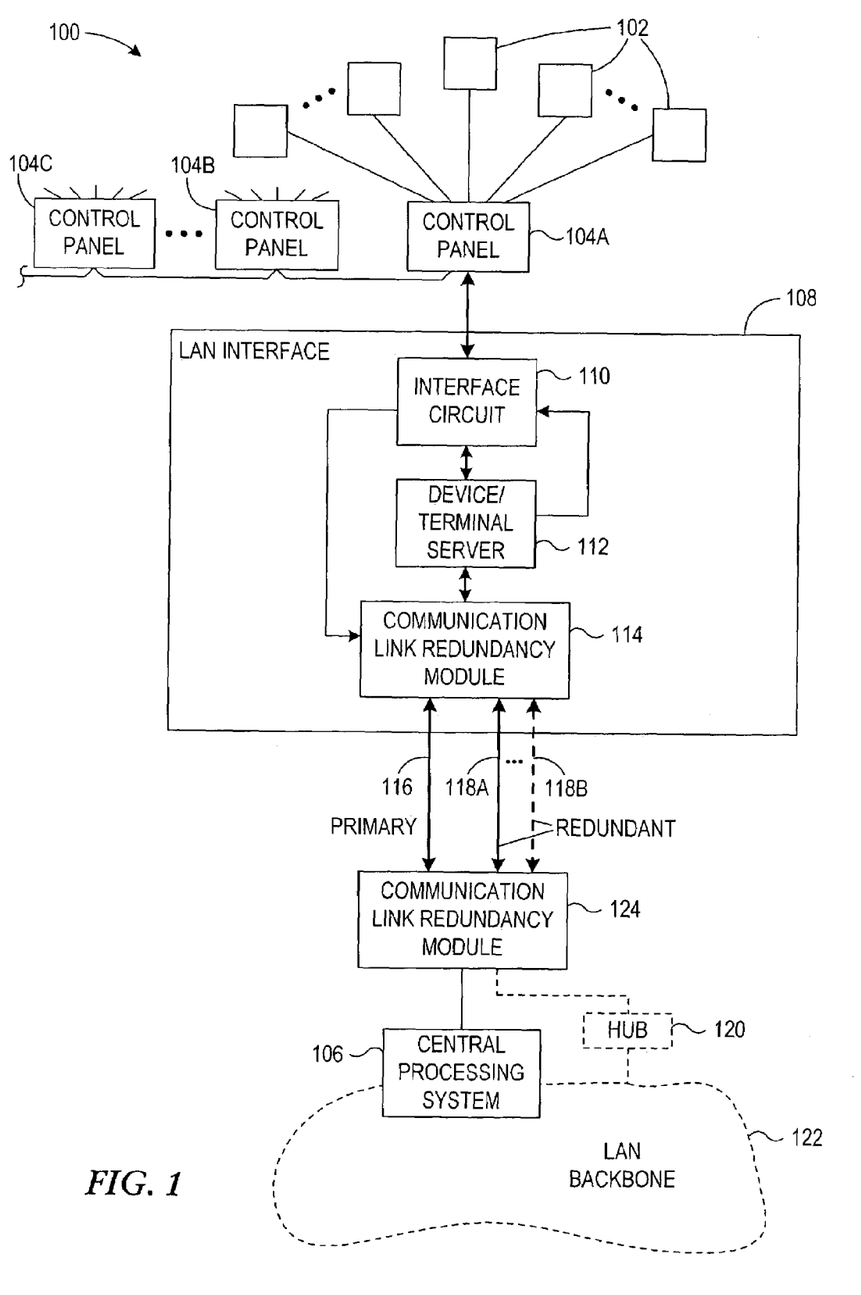
FIG. 1 is a block diagram illustrating a representative networked safety system in which the present invention may be employed.

FIG. 1 is a block diagram illustrating a representative networked safety system 100 in which the present invention may be employed. A number of devices 102 may be coupled to a control panel 104A. The control panel 104A and devices 102 may represent, for example, a life safety system panel, such as the XLS1000 system commercially provided by Honeywell Inc., Golden Valley, Minn., U.S.A. The devices 102 may include any number of detectors, sensors, controllers, etc., to detect and control safety-related conditions. For example, the devices 102 may include photoelectric, ionization, and thermal sensors to detect conditions such as smoke, heat, or other conditions relating to the possible presence of a fire. The devices 102 may also provide control circuits for controlling a facilities' Heating, Ventilation and Air Conditioning (HVAC) equipment such as fans and dampers, to contain smoke and create safe havens. Control functions may also perform tasks such as releasing fire doors to permit safe exit, monitoring fire "pull stations," and monitoring/controlling on-site sprinkler systems and fire pumps. A number of similar control systems 104B, 104C, etc. may be provided to extend the networked safety system 100 by way of, for example, a peer network.

These devices 102 may be coupled to the control panel 104A, from which monitoring and/or control of the devices may be performed. However, as previously indicated, it may be desirable to monitor/control such devices via one or more central processing systems 106 that communicate with the various control panels, detectors, and other circuits by way of a network. To communicate with the central processing system 106 via a network, a network interface 108 is provided in accordance with the present invention. In the illustrated example, the network is a local area network (LAN), and the network interface 108 thus represents a LAN interface. In this manner, the control panel 104A (and other control panels 104B, 104C) can communicate with the central processing system(s) 106 via the LAN interface 108.

In one embodiment of the invention, the control panel 104A communicates with the LAN interface 108 via a serial communication interface, although other communication interfaces such as a parallel interface may also be implemented. In a more particular embodiment, the control panel 104A and LAN interface 108 communicate via the well-known RS-232. RS-232 is a single-ended data transmission technology that utilizes independent channels for full-duplex communication. Alternatively, other single-ended data transmission specifications may be used, such as RS423, etc. Furthermore, differential data transmission technologies may alternatively be employed, such as RS422 or RS485, which may be beneficial for longer or inherently "noisy" connections. Any appropriate data transmission technology may be used to communicate between the control panel(s) 104A, 104B, 104C and the LAN interface 108.

In one embodiment, the RS-232 interface is established between the control panel 104A and an interface circuit 110 of the LAN interface 108. The interface circuit 110 communicates with a device or terminal server 112 that facilitates the interface to the LAN. The device/terminal server 112 may represent, for example, a LANTRONIX UDS-10 device/terminal server, COBOX-E2 device/terminal server, COBOX-FL device/terminal server, or other analogous device server device.

The LAN interface 108 communicates over a network, such as a standard Ethernet network, to the central processing system 106. The central processing system 106 represents, for example, a computer or other computing system capable of collecting data from the LAN interface and optionally from other types of building control systems. Via this computing system 106, the information, alarms, etc. can be displayed and/or controlled. As is described in greater detail below, the interface circuit 110, terminal server 112, and communication link backup module 114 of the LAN interface 108 provide the ability to select between a plurality of communication links to the network, on which the central processing system 106 may be connected. For example, a primary communication link 116 may be provided, along with one or more redundant communication links 118A, 118B, etc. In one embodiment of the invention, two redundant communication links are provided, including the primary link 116 and a redundant link 118A. This connection may be made directly from the LAN interface 108 to the central processing system 106, or alternatively an intermediary hub 120 or other switch may be used to access a central processing system 106 on the LAN backbone 122. The redundant communication links used in accordance with the present invention greatly enhances communication integrity between the control panel 104A, 104B, etc. (and/or devices 102) and the central processing system 106 through monitoring, control, and selection of the appropriate communication links 116, 118A between the LAN interface 108 and the central processing system 106. As will be described in greater detail below, the interface circuit 110, terminal server 112, and master communication link redundancy module 114 in one embodiment of the invention provide this monitoring, control, and selection of the appropriate communication link to a slave communication link redundancy module 124 and ultimately to the central processing system 106.

The present invention addresses communication redundancy issues between the LAN interface 108 and the central processing system 106 (or hub 120) as part of the standard network. For purposes of illustration and not of limitation, the network and LAN connection are described herein in terms of an Ethernet network or analogous network such as the IEEE 802.3 standard (hereinafter collectively referred to as Ethernet). It should be recognized, however, that the principles described herein may be applied to other networking technologies, and the invention is clearly not limited to the representative Ethernet embodiments described herein.

Generally, Ethernet refers to a local area network (LAN) technology used for connecting computing equipment within a particular area. Ethernet operates over coaxial cable, twisted pair, various multi-conductor cables. For LAN interconnection, Ethernet is a physical link and data link protocol reflecting the two lowest layers of the OSI model. Ethernet specifies a CSMA/CD (Carrier Sense Multiple Access with Collision Detection), which is a technique of sharing a common medium among several devices. If a node on the network detects a collision, it alerts the other nodes by jamming the network. Then, after a random delay, the sending nodes try again.

Devices that connect directly to a LAN often do so through a network interface card (NIC) or circuitry providing analogous functionality. A NIC and associated transceiver may provide functions including, for example, providing a physical interface to the transmission medium, monitoring busy/idle status of the network, buffering the speeds and converting protocols between devices and the network, assembling the transmitted data stream into packets and restoring the data stream at the receiving end, recovering from collisions, etc. In one embodiment of the invention, the central processing system(s) 106 includes at least one NIC to provide the physical interface to the LAN.

In accordance with the present invention, the redundant connections (e.g., including the primary 116 communication link and one or more redundant 118A, 118B communication links) enable continued communications in the event of a failure of any one of the communication links. In one embodiment, the interface circuit 110 monitors the condition of the LAN via a control signal(s) from the terminal server 112. If a short circuit between any one or more signal paths of the communication link occurs on the currently-active Ethernet communication link, or an open circuit of any of the signal paths occurs on the currently-active Ethernet communication link, the control signal from the terminal server 112 will indicate such a short or open circuit condition. This signal from the terminal server 112 is recognized by the interface circuit 110, which in turn controls the communication link backup module 114 to switch the connection to another communication link, thereby maintaining the LAN connection. The ability to recognize any short or open circuit condition of any of the signal paths associated with the LAN connection, and to appropriately select a redundant communication link in response thereto, provides reliability for the LAN connection as a whole. Embodiments of the invention that provide such redundant communication links for any such short and open signal path condition advantageously complies with respective requirements of the UL standard 864.

Figure 2:
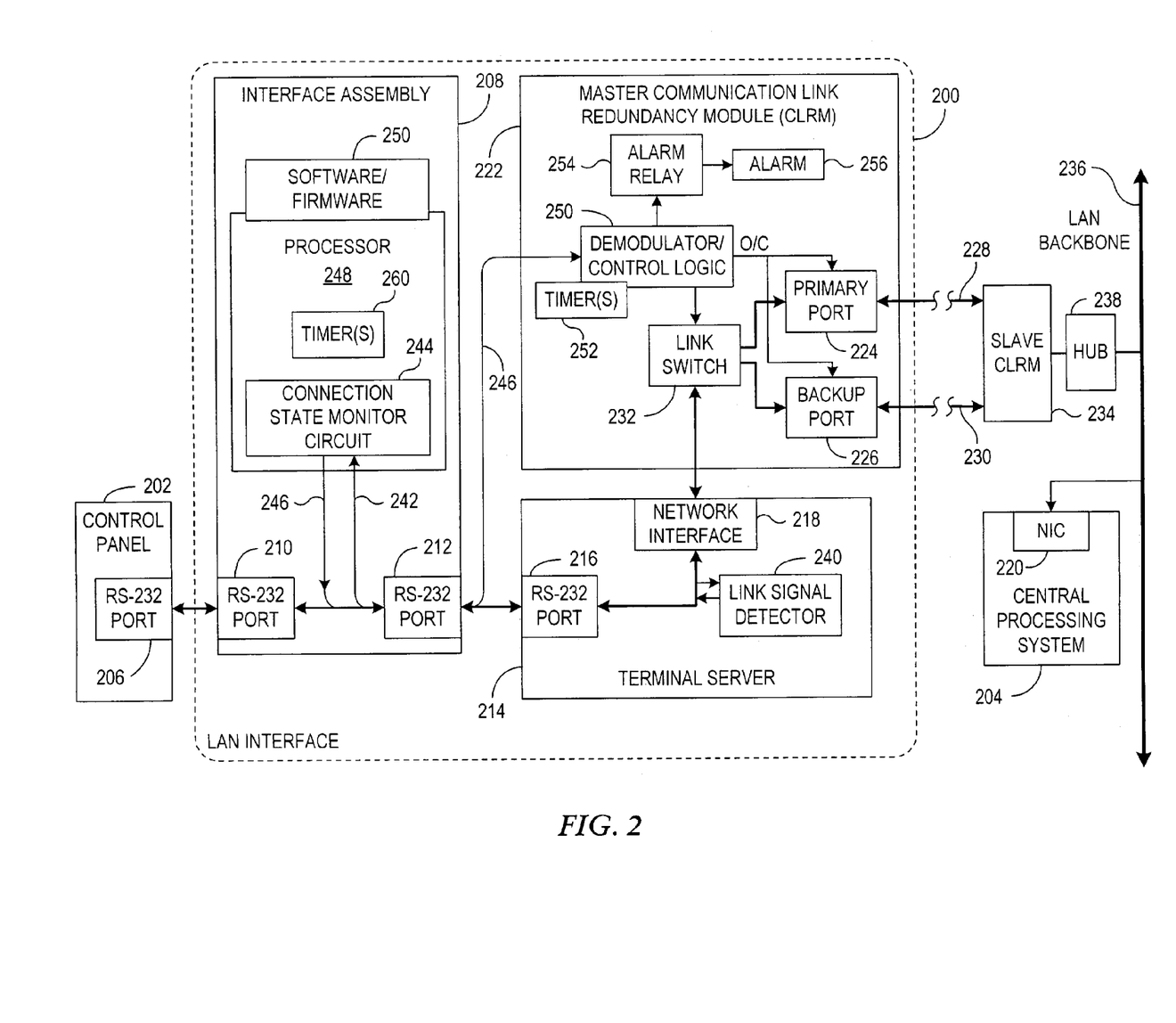
FIG. 2 is a block diagram illustrating one embodiment of a LAN interface in accordance with the present invention.

FIG. 2 is a block diagram illustrating one embodiment of a LAN interface 200 in accordance with the present invention. Similarly to that described in FIG. 1, the illustrated embodiment of FIG. 2 provides the LAN interface between the control panel 202 and the central processing system 204. The illustrated control panel 202 includes an RS-232 port 206 which communicates serially with the interface assembly 208 via RS-232 port 210, although any desired data communication interface may be implemented. The interface assembly 208 includes another data communication port, an RS-232 port 212 in the illustrated example, for communicating with the terminal server 214 via its RS-232 port 216. The terminal server 214 ultimately communicates with the central processing system across the network (e.g., LAN) via the network/LAN interface 218 at the terminal server 214 and the network interface card (NIC) 220 at the central processing system 204. In this manner, information can be communicated between the control panel(s) 202 and the central processing system(s) 204.

In accordance with the present invention, the connection between the terminal server 214 (or other analogous device server providing the network interface) and the central processing system 204 is configured to include redundant communication links. In accordance with one embodiment of the invention, a communication link redundancy module 222 is provided, which facilitates selection of one of a plurality of available communication links in which to communicate across the network. In the illustrated embodiment, the network connection is a LAN connection employing Ethernet/IEEE 802.3 technology; i.e., 10Base-T technology. However, other similar technologies such as 100Base-T, Gigabit Ethernet, etc. may also be utilized in connection with the present invention.

The communication link redundancy module (CLRM) 222 provides a plurality of LAN ports each associated with a respective redundant LAN communication link. In the illustrated embodiment of FIG. 2, two LAN ports are provided including the primary port 224 and the backup port 226, which facilitate communication across redundant LAN communication links 228, 230 respectively. More particularly, information transmitted from the control panel 202 is passed from the interface assembly 208 to the terminal server 214, which in turn performs the appropriate protocol conversion to pass the information via the network interface 218. The information is provided to a link switch module 232 of the master CLRM 222. In response to commands generated at the interface assembly 208 (described in greater detail below), the link switch module 232 switches the information to one of the redundant LAN ports 224, 226. The information is transmitted across the respective communication link 228, 230. In one embodiment of the invention, a slave CLRM 234 receives the information and provides it to the NIC 220 of the central processing system 204. In one embodiment, the central processing system may be coupled to the LAN backbone 236 via a hub 238 or other switching/routing device. Information may be transmitted from the central processing system 204 to the control panel 202 in an analogous fashion.

In accordance with the present invention, the appropriate communication link 228, 230 is selected based on the communication state of the communication links, or at least on the communication state of the currently-active communication link. In one embodiment, the integrity of the currently-active communication link is monitored by sending signals or messages between the central processing system 204 and the LAN interface 200, even during idle periods. If the signals/messages cease or are otherwise disrupted, it can be detected as a communication link fault, prompting switching to a redundant communication link. In accordance with the present invention, any disturbance of signals transmitted across the network disrupts the signal/message so that individual or collective short or open circuit conditions on the LAN communication link are detected.

In one embodiment of the invention, the signal used to monitor the integrity of the active communication link is a link pulse provided by Ethernet/IEEE 802.3 network interfaces. In general, the Ethernet physical layer for each transmission rate is typically divided into sublayers that are independent of the particular media type, and sublayers that are specific to the media type or signal encoding. The physical medium attachment (PMA) sublayer generally contains the signal transmitters and receivers (transceivers). A representative Ethernet version (e.g., 10Base-T) includes a link integrity test to determine the health of the communication link. A normal link pulse (NLP), an out-of-band communications mechanism, is used to indicate link status. After power on, the PMA typically transmits a link pulse (NLP) to tell the NIC or other network interface at the other end of the link that this NIC wants to establish an active link connection. If the network interface at the other end of the communication link is also powered on, it will respond with its own link pulse. Alternatively, if the network interface at the other end of the link is not powered up, this NIC continues to send a link pulse periodically until it receives a response. The link is activated after both network interfaces are capable of exchanging valid link pulses. The network interfaces then continually monitor the receive data path for activity as a means of checking that the communication link is working properly, and when the network is idle, the network interfaces send the NLP to one another to verify link integrity. Alternatively, autonegotiation functions in other network interfaces may use a modified 10Base-T link integrity pulse sequence where the normal link pulses (NLPs) are replaced by bursts of fast link pulses (FLPs). For example, an FLP may include a number of clocking pulses interspersed with a number of signal pulses to form an x-bit bit code word. If a signal pulse occurs between two clocking pulses, that bit is a binary "1," where absence of such a signal pulse is a "0."

Other analogous communication link integrity signals may also be used in connection with the present invention, including the exchange of messages over the LAN connection itself, or other inter-device signaling technologies. For example, in one embodiment of the invention, the central processing system 204 periodically (e.g., every 5 seconds) transmits a message indicating that it is operable. The LAN interface in such an embodiment is assigned a unique Internet Protocol (IP) address on the LAN, and can be designated as the targeted recipient of this message. When the terminal server 214 or other designated circuitry within the LAN interface recognizes this message, it responds with its own operability message using the IP address of the central processing system 204 (or hub 238, as the case may be). These messages are sent back and forth and any desired rate, thereby allowing additional control as to the length of time in which a communication link problem has occurred. When either the LAN interface 200 and/or the central processing system 204 recognizes that a message was not returned within a particular time, a message retry operation may optionally be performed, and the problem is then recognized if communication was unsuccessful. As in the case where an NLP is monitored, any short circuit and/or open circuit condition on the LAN connection will disrupt the message. Either the disrupted message, and/or the loss of further messages due to discontinuing sending messages when a disrupted message is recognized, will be detected at the link signal detector 240.

By using any such link signal or message (hereinafter referred to as "link signal"), the LAN interface 200 can detect a problem on a currently-active communication link 228, 230, and can initiate a change to a redundant communication link in response thereto. The terminal server 214 may first detect the disruption to the link signal via the link signal detector 240. Alternatively, the central processing system 204 may detect the disruption to the link signal, and in response can suspect further transmission of its link signal. Suspension of the link signal then allows the terminal server 214 to detect the loss of the link signal via the link signal detector 240. In either case, the terminal server 214 monitors for the link signal to confirm that the present communication link is functioning properly. When the link signal detector 240 determines that the link signal has not occurred in a particular time duration, the link signal detector 240 provides an indication of this condition by way of a control signal to the interface assembly 208, as illustrated by signal path 242 to the connection state monitor circuit 244.

It is noted that the link signal is disrupted in response to any short circuit or open circuit condition of the LAN communication link. For example, one representative LAN connection includes four conductors including two transmit conductors (e.g., Tx−, Tx+) and two receive conductors (e.g., Rx−, Rx+). Any short circuit between any two or more of these conductors causes the link signal to be disrupted from its normal condition and/or causes the link signal to cease completely. Further, an open circuit condition of any one or more of the transmit/receive conductors will also cause the link signal to be disrupted and/or suspended. Any combination of such short circuit and open circuit conditions also disrupts the link signal. Therefore, in accordance with the present invention, any one or more short circuit and/or open circuit conditions will cause the link signal to be suspended, which is detected by the link signal detector 240 at the terminal server 214.

As previously described, when a disruption/suspension of the link signal has been detected, the link signal detector 214 provides a control signal of this condition to the interface assembly. In one embodiment of the invention, this control signal is sent to the interface assembly via the RS-232 ports 216, 212. The connection state monitor circuit 244 monitors for this control signal. In one embodiment, the control signal is represented by a change of logic state of the monitored signal on signal path 242. When the connection state monitor circuit 244 recognizes a change of state of the control signal, thereby indicating disruption/loss of the link signal, it provides a command(s) to the CLRM 222 as shown on signal path 246. This command is ultimately used to control switching of the active communication link to a redundant communication link, as described more fully below. The connection state monitor circuit 244 may be implemented using discrete hardware components, processor/software, or a combination thereof. For example, in one embodiment of the invention, the connection state monitor circuit 244 includes a processor 248 and associated software/firmware 250. Using polling, interrupts, or other monitoring techniques, a processor-based monitor circuit 244 recognizes the change of state of the control signal provided by the terminal server 214 when the link pulse is disrupted/suspended. Such a processor-based monitor circuit 244 can also create and initiate transmission of the appropriate command to control the functions at the CLRM 222. In one embodiment of the invention, commands provided on signal path 246 includes a series of pulses, and a particular command is used to cause the CLRM 222 to switch from the current communication link to another communication link.

In one particular embodiment, the control signal from the terminal server 214 is monitored by a processor-software-based connection state monitor circuit 244. When the control signal changes state indicating a disruption/loss of the link signal, one or more commands are sent from the connection state monitor circuit 244 to the master CLRM 222 as shown on signal path 246. The master CLRM 222 includes demodulator/control logic 250 to demodulate the commands if necessary. The commands direct the control logic 250 to perform particular functions. In one embodiment of the invention, one command directs the control logic 250 to switch the connection to another communication link, based on the connection state monitor circuit's 244 recognition of the control signal indicating a disruption/loss of the pulse signal. In response, the control logic 250 provides a switch control signal to an associated link switch 232, which in turn establishes the LAN connection using one of the plurality of available LAN ports. In the illustrated example, two LAN ports 224, 226 are provided, and the link switch 232 will establish the LAN connection using the LAN port that is not associated with a faulty communication link.

For example, assume that the active communication link is communication link 228 associated with the primary port 224. The disruption/loss of the pulse signal detected by the link signal detector 240 indicates that any one or more signals on the communication link 228 have short circuited and/or open circuited. The terminal server 214, by way of the link signal detector or associated circuitry, provides the control signal to the connection state monitor circuit 244 via signal path 242. The connection state monitor circuit 244 recognizes the disruption/loss of the pulse signal based on the state of the control signal, and in response sends a command via signal path 246 to the control logic 250 of the master CLRM 222. The control logic sends the appropriate switch control signal to the link switch 232 to switch from the primary port 224 to the backup port 226, thereby re-establishing the LAN connection to the central processing system 204 (or hub 238) via communication link 230.

In one embodiment of the invention, a command is periodically sent from the connection state monitor circuit 244 to the control logic 250, even if it is a repeat of the last command sent. For example, the command may be sent every fifteen seconds, regardless of whether the signal embodied by the command has changed. If the CLRM 222 does not receive the signal within a predetermined time (e.g., thirty seconds), it will initiate the switch control signal to notify the link switch 232 to switch to the primary port and activate the alarm signal. One or more timers 252 may be used to determine whether the signal has been received within the requisite time. In this manner, an alarm signal can be activated even if a problem occurs in sending the command from the interface assembly 208 to the CLRM 222.

Another command that may be sent from the interface assembly 208 to the master CLRM 222 in response to a faulty communication link is a command to close/open a relay contact. More particularly, a command may be sent by the connection state monitor circuit 244 to the control logic 250 via signal path 246 to direct the control logic 250 to cause the alarm relay 254 to activate the alarm 256. This may be effected by way of the command from the interface assembly 208, or alternatively may be effected internally at the CLRM 222. For example, in the scenario described above where a problem occurs in sending the command from the interface assembly 208 to the CLRM 222, the CLRM 222 can cause a redundant port/link to be selected after expiration of the time delay, and may also cause the alarm relay 254 to activate the alarm 256. It should be noted that while the alarm relay 254 and alarm 256 are illustrated as being part of the CLRM 222, this need not be the case. In one embodiment, the alarm relay 254 is housed on a circuit board associated with the LAN interface 200, and the alarm(s) may be positioned on the various control panels 202 and/or the central processing system(s) 204 in the system.

The commands send from the interface assembly 208 to the master CLRM 222 may also include signals to open or close the LAN connection. For example, the transmit and receive conductors can be short-circuited to close the LAN connection, and the transmit and receive conductors can be open-circuited to open the LAN connection. This may be used, for example, during initialization of the system to initially determine an appropriate communication link in which to establish communication. In such a case, the control logic 250 sends an open/close (O/C) signal to the appropriate ports 224, 226 in response to the command sent by the interface assembly 208.

Further functionality may be employed to further confirm operation of the redundant communication links. For example, the interface assembly 208 may direct the master CLRM 222 to alternate the LAN connection periodically. In this embodiment, the interface assembly 208 sends a command to the CLRM 222 every predetermined time period, such as one hour, to switch to another communication link 228, 230. The communication link changeover will only occur when there are no messages to be transmitted to the central processing system 204 and a message is not currently being received from the central processing system 204. If either of these conditions is present, the interface assembly 208 can wait a predetermined time duration, such as 15 seconds, to again attempt to effect the communication link switch. The interface assembly includes one or more timers 260 to provide the requisite communication switch and retry time durations. The timers 260 may be implemented using discrete hardware, such as resistor-capacitor circuits, counters, frequency dividers, etc. Alternatively (or in addition), the timers may be implemented as a function of the processor 248 operating under the control of software/firmware 250. Further, the communication link redundancy module 222 may wait the predetermined time duration (e.g., fifteen seconds) using one or more timers 252 to retry the communication link switch.

As previously indicated, a slave CLRM 234 may be used at the central processing system/hub side of the LAN connection. In this case, each of the redundant communication links 228, 230 are coupled between the master CLRM 222 and the slave CLRM 234. The slave CLRM 234 will select the appropriate communication link 228, 230 to provide to the hub 238 (or directly to the central processing system 204) depending on the action of the master CLRM 222. Thus, if the master CLRM 222 switches from the primary port 224 to the backup port 226 such that communication link 230 becomes the active communication link, then the slave CLRM 234 will also switch to allow the communication link 230 to be used. This control may be effected directly between the two CLRMs 222, 234. In one embodiment of the invention, the master and slave CLRMs are implemented using modified versions of the SHORE MICROSYSTEMS' SM-2501 Link Protector.

Under normal operation, messages received from either the control panel 202 or the central processing system 204 pass through the LAN interface 200 unchanged. These messages may include report requests and responses, control panel state messages, commands, etc. Delta messages from the control panel(s) 202 that indicate a change of state may be modified before being sent to the central processing system 204. For example, a time and/or date stamp may be applied, a delta class, and acknowledge identification (ID) may be added before the message is forwarded. The delta class may represent, for example, the classification of the change, such as alarm, supervisory, trouble, monitor, etc. The acknowledge ID may indicate the control panel number or other assigned identifier for tracking purposes. These and other types of messages sent between the control panel(s) 202 and the central processing system 204 are reliably transmitted using the redundant communication link methodology of the present invention.

Figure 3:
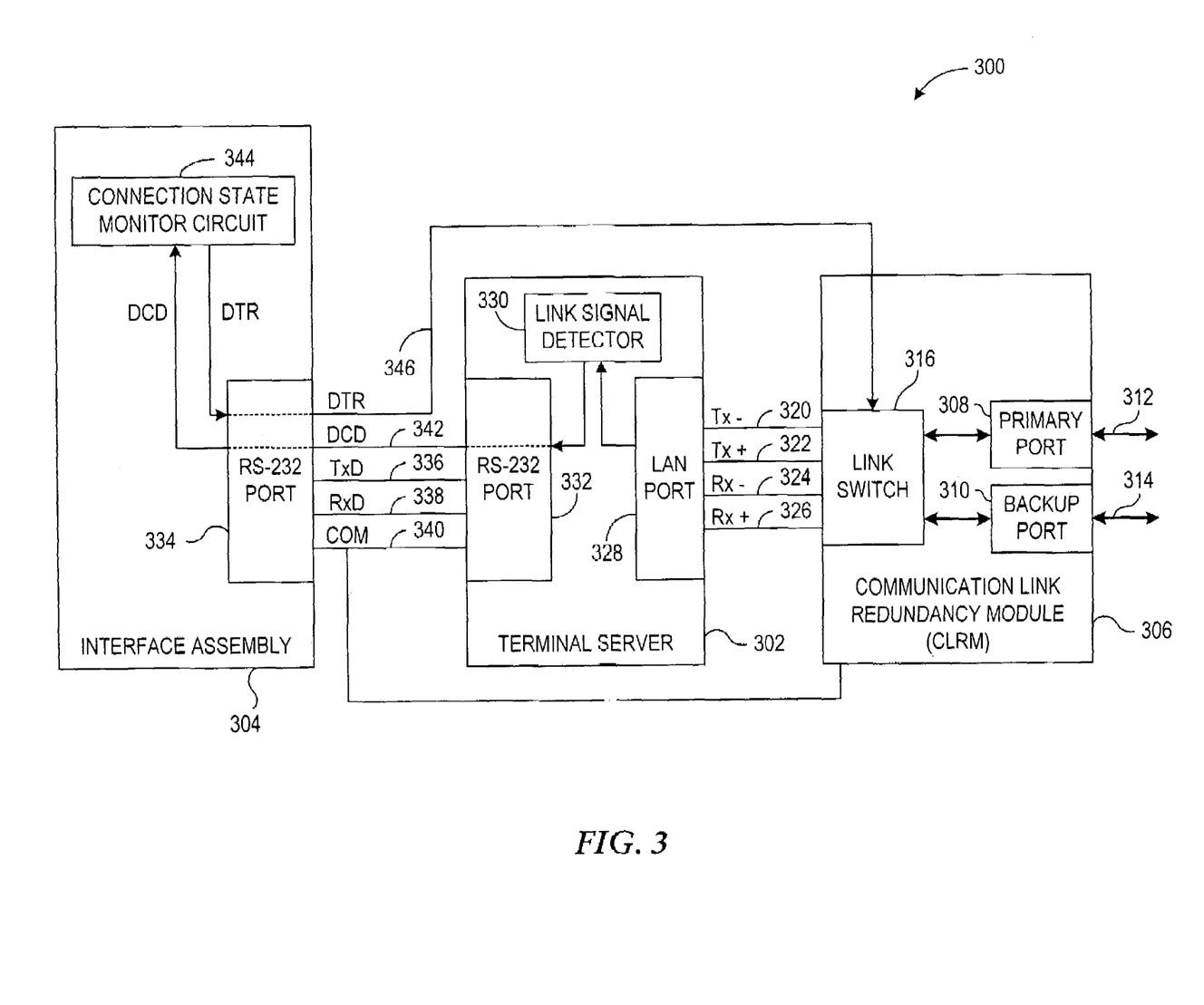
FIG. 3 is a block diagram illustrating a portion of a LAN interface in accordance with a more particular embodiment of the invention.

FIG. 3 is a block diagram illustrating a portion of a LAN interface 300 in accordance with a more particular embodiment of the invention. The embodiment of FIG. 3 illustrates an exemplary manner for providing the control signal (indicating a disruption and/or loss of the pulse signal) from the terminal server 302 to the interface assembly 304, and for providing the command(s) from the interface assembly 304 to the communication link redundancy module (CLRM) 306. As was described in connection with FIG. 2, the CLRM includes multiple LAN ports, each associated with a redundant LAN communication link. In the example of FIG. 3, two such ports are provided, including the primary port 308 and one backup port 310, from which redundant communication links 312, 314 are provided. The link switch 316 determines which of the ports 308, 310 will be selected for the active communication link. As previously described, the link switch 316 is controlled by one or more commands generated at the interface assembly 304. The command(s) are generated in response to the terminal server 302 recognizing a control signal indicative of the disruption and/or loss of a communication exchange between the terminal server 302 and the central processing system or hub (not shown). FIG. 3 illustrates an exemplary manner in which the control signal and command may be transmitted to the various functional elements of the system.

As an example, assume that communication between the LAN interface 300 and a central processing system/hub is established via primary port 308 and communication link 312. During idle periods on the communication link 312, a link signal such as an NLP may be transmitted across the communication link 312 via the primary port 308. Because FIG. 3 assumes a standard LAN connection, the physical medium includes a cable (e.g., coaxial, twisted pair, etc.) having four conductors including a differential transmit pair (Tx− 320, Tx+ 322) and a differential receive pair (Rx− 324, Rx+ 326). These signals are transmitted between the CLRM 306 and the LAN port 328 of the terminal server 302. If any two or more of the transmit or receive signals are shorted together, or if any one or more of the transmit or receive signals are open-circuited, the link signal will be disrupted, and will ultimately be suspended by either or both of the central processing system or the terminal server 302. If the link signal is not detected by the link signal detection module 330, a control signal is generated and transmitted to the interface assembly 304 via the RS-232 ports 332, 334 of the terminal server 302 and interface assembly 304 respectively. The RS-232 interface between the terminal server 302 and the interface assembly 304 includes at least a transmit data (TxD) 336 connection, a receive data (RxD) 338 connection, and a common (COM) 340 connection. The COM 340 connection provides a common reference for the interface assembly 304, terminal server 302, and CLRM 306.

The RS-232 interface also includes a data carrier detect (DCD) 342 connection. In one embodiment of the invention, the control signal generated by the link signal detection module 330 is provided by way of the DCD 342 of the RS-232 interface. This control signal is provided to the connection state monitor circuit 344, which recognizes a change of state of the control signal indicating a disruption and/or loss of the exchanged communication signal (e.g., link pulse). Upon recognizing the change of state of the control signal, the connection state monitor circuit 344 provides a command to the link switch 316 of the CLRM 306 to switch the LAN connection from communication link 312 to the backup communication link 314. In one embodiment, this is accomplished by sending a series of pulses representing the command via the data terminal ready (DTR) 346 pin on the RS-232 port 334, which is ultimately coupled to the link switch 316 of the CLRM 306. The CLRM 306 may first receive and process the command, and notify the link switch 316 that a LAN port switch is to occur. The link switch 316 then disables the primary port 308, and enables communication via the backup port 310 such that communication is re-established on the backup communication link 314 rather than the primary communication link 312. In one embodiment, successful re-establishment of a connection on the redundant communication link is accompanied by a condition being provided to the central processing system to allow it to make the appropriate notifications that a problem has occurred on the network connection. In the mean time, communication will continue on the backup communication link 314.

Figure 4:
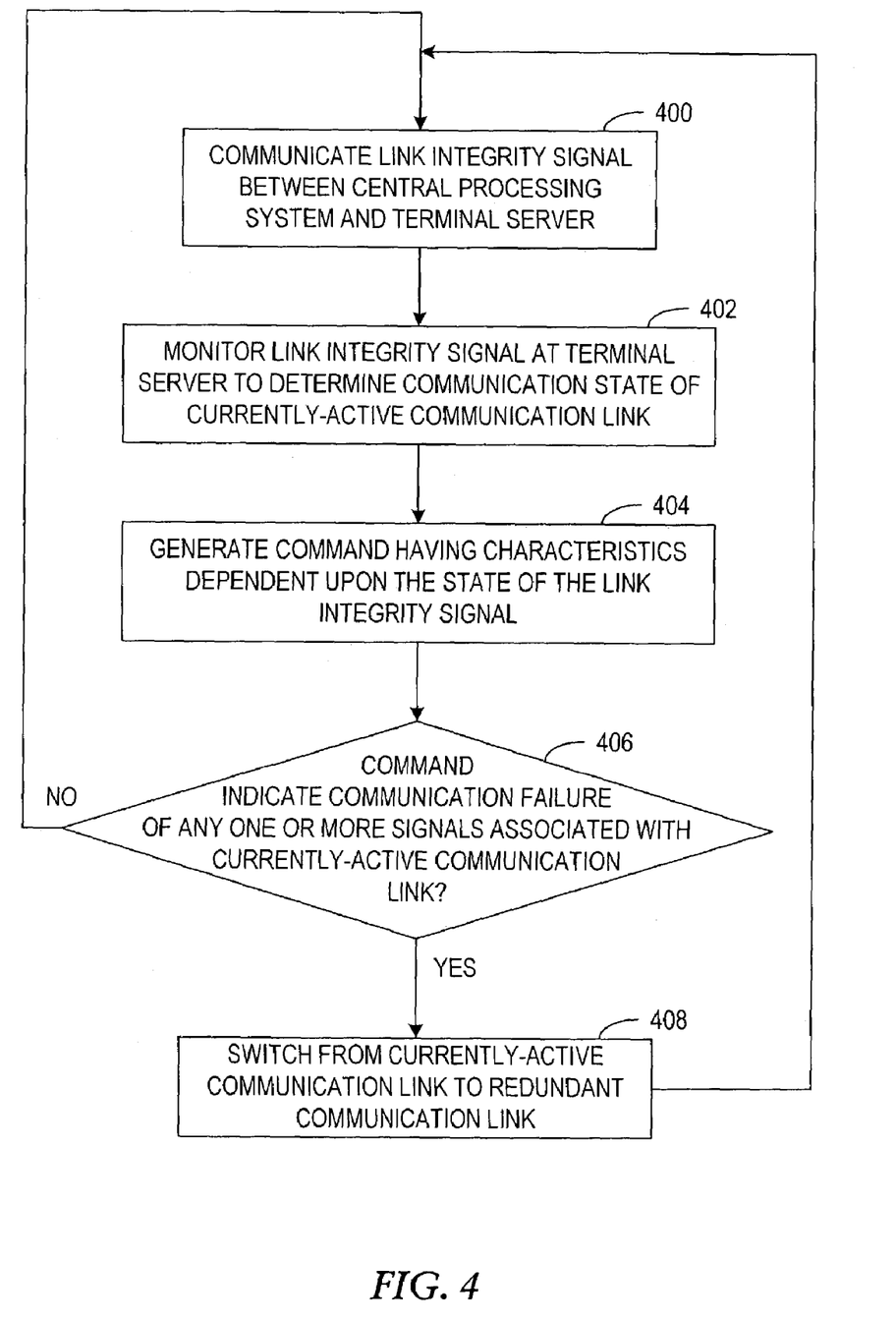
FIGS. 4 and 5 are flow diagrams of various embodiments of methods for controlling a plurality of redundant communication links in a networked safety system.

FIG. 4 is a flow diagram of one embodiment of a method for controlling a plurality of redundant communication links in networked systems, such as fire safety systems, access control systems, security systems, and the like. A link integrity signal is communicated 400 between the central processing system (or hub as the case may be) and the terminal server or other similar interface device. The link integrity signal is indicative of a complete loss of a LAN connection, and/or a short-circuit of any two or more of the signal conductors comprising the LAN connection, and/or an open-circuit of any one or more of the signal conductors comprising the LAN connection. Any such condition will affect the integrity of the link signal, and thus provides an indication of the integrity of the currently-active communication link. As previously indicated, the link integrity signal may be a periodic signal sent between the central processing system/hub and the terminal server (e.g., NLP), or other communication exchange such as messages sent back and forth to IP-addressable central processing systems/hubs and terminal servers.

The link integrity signal is monitored 402 at the terminal server to determine the communication state of the currently-active communication link. Based on the link integrity signal (and thus ultimately based on the state of the currently-active communication link), a command is generated 404. In one embodiment, the command is based on the state of a control signal generated at the terminal server, which in turn is based on the state of the link integrity signal. For example, a control signal may be generated at the terminal server as a simple binary logic signal in one embodiment of the invention. In this embodiment, a first logic level (e.g., low logic level) may represent the presence of a normal link integrity signal, and a second logic level (e.g., high logic level) may represent a disrupted and/or suspended link integrity signal. This control signal may then be monitored by the interface assembly, which in turn generates the command based on the state of the control signal.

It is then determined 406 whether the command indicates a communication failure of any one or more signals associated with the currently-active communication link. If not, no switching as a result of a faulty communication link is required, and the communication 400 of the link integrity signal continues. On the other hand, if the command indicates a communication failure as a result of any of the conductors of the LAN interface being short-circuited or open-circuited, the LAN connection will be switched 408 from the currently-active communication link to a redundant communication link. It is noted that the subsequent failure of the redundant communication link may ultimately result in an attempt to switch back to the original communication link, or to switch to another redundant communication link in the case of more than two communication links are available.

Figure 5:
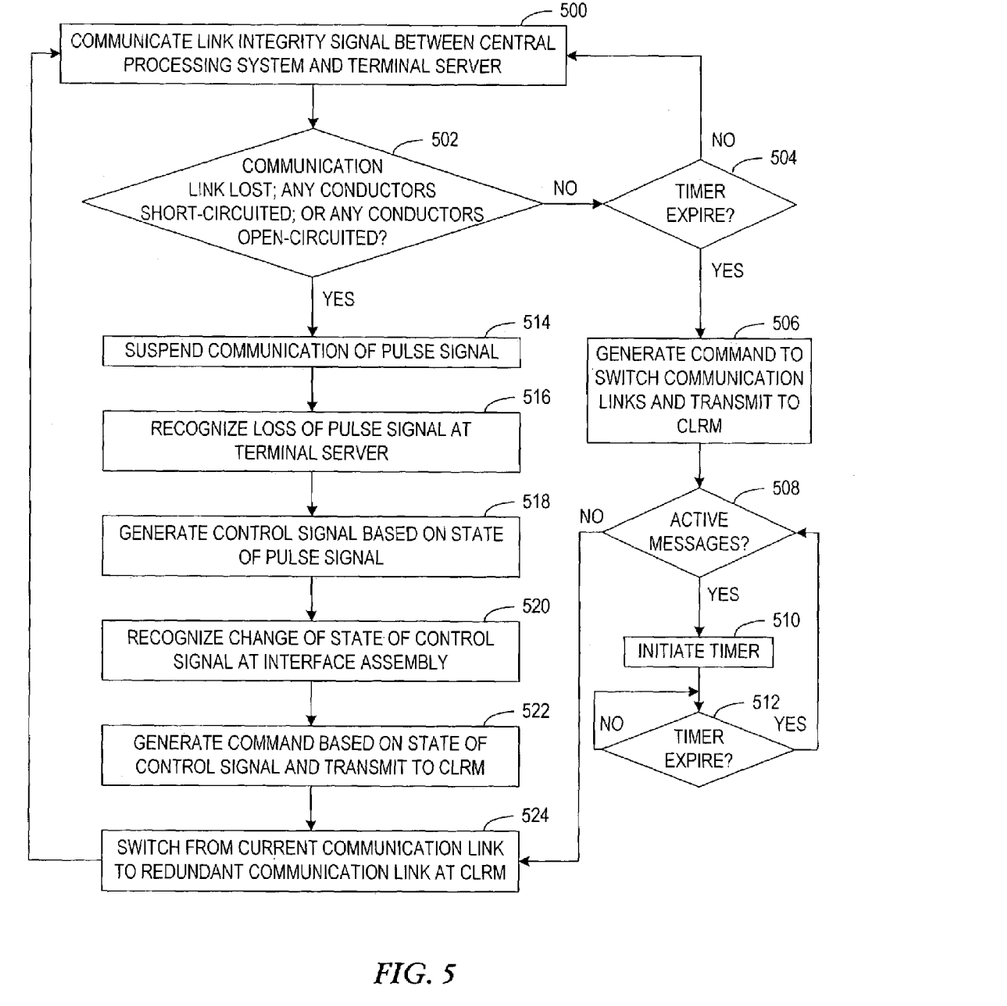

FIG. 5 is a flow diagram of another embodiment of a method for controlling a plurality of redundant communication links in a networked system. The link integrity signal is communicated 500 between the central processing system (or hub as the case may be) and the terminal server or other similar interface device. It is determined 502 whether the communication link is lost, and/or any conductors are short-circuited or open-circuited. If not, communication 500 of the link integrity signal continues. In one embodiment of the invention, normal communication is periodically alternated between the various redundant communication links of the system. For example, the LAN connection may be alternated between a primary and backup communication link every hour. If the timer (e.g., one hour timer) has not expired as determined at decision block 504, normal link integrity signal communication 500 continues. If the timer has expired 504, the interface assembly generates a command to switch the communication link to another communication link, and the command is transmitted to the communication link redundancy module (CLRM) as shown at block 506.

In one embodiment, alternating communication links will not be allowed when there are messages to be transmitted to the central processing system, or if a message is currently being received from the central processing system, which is determined at decision block 508. If no such messages are active, the CLRM switches 524 from the current communication link to a redundant communication link. On the other hand, if messages are to be transmitted to the central processing system or a message is currently being received from the central processing system as determined at decision block 508, a timer is initiated 510 in order to initiate a retry process. For example, another attempt to switch from the current communication link to the redundant communication link may be delayed for fifteen seconds. When this fifteen second duration (or other established duration) has expired 512, it may again be determined 508 if any such "active" message processes are in progress. This may continue until no messages are to be transmitted to the central processing system or the pending message has been received by the central processing system. At this time, the CLRM switches 524 from the current communication link to a redundant communication link.

If it is determined 502 that communication link is lost, and/or any conductors are short-circuited or open-circuited, communication of the pulse signal may be suspended 514. Either the central processing system or the terminal server may first recognize the loss of the communication link and suspend 514 the pulse signal. In any case, the terminal server ultimately recognizes 516 the communication link fault. A control signal is generated 518 at the terminal server, where the state of the control signal is based on the state of the pulse signal. For example, because the pulse signal has been suspended, the control signal will reflect this condition. In one embodiment, the control signal is continuously monitored by the interface assembly, and where the link integrity signal is being properly communicated, the control signal will reflect that condition as well. The control signal is monitored at the interface assembly, and in the case of suspended pulse signal communication, the interface assembly will recognize 520 the change of state of the control signal. Based on this information, a command is generated and transmitted to the CLRM as shown at block 522. This command directs the CLRM to switch 524 from the current communication link to a redundant communication link, so that communication between the one or more control panels and the central processing system(s) may continue.

Figure 6:
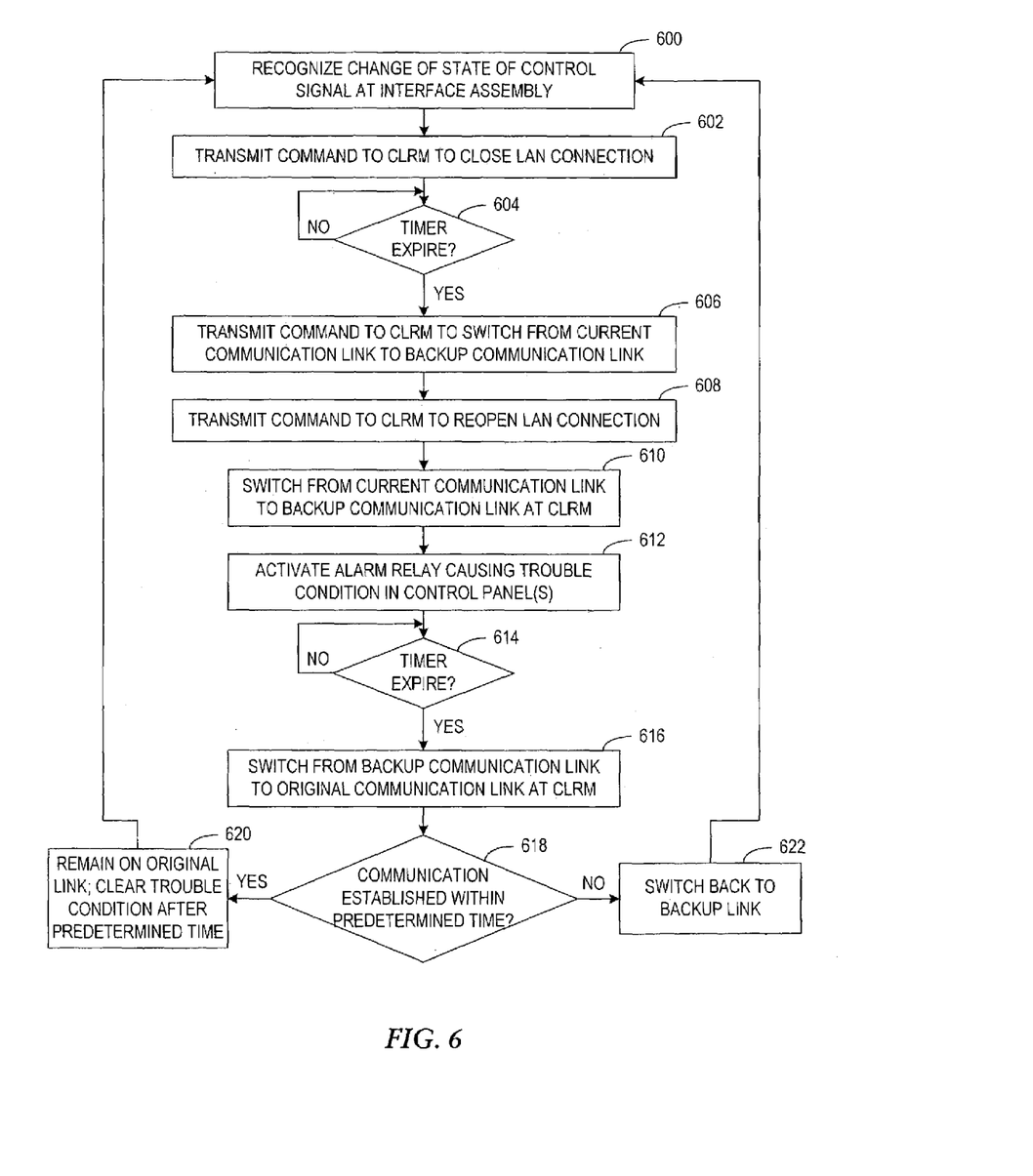
FIG. 6 is a flow diagram illustrating one embodiment of a method for attempting to re-establish communication on a previously failed communication link.

FIG. 6 is a flow diagram illustrating one embodiment for attempting to re-establish communication on a previously failed communication link. The interface assembly recognizes 600 the change of state of the control signal, thus indicating a short-circuit, open-circuit, or other failure of the currently-active communication link. A command is transmitted 602 to the CLRM to close the LAN connection. As described in connection with FIG. 2, this can be accomplished by providing an open/close (O/C) signal to the appropriate primary/backup port(s) at the CLRM. The LAN connection is closed for a predetermined period, such as thirty seconds, to ensure that the central processing system also recognizes the loss of communications due to its internal timer expiring. At the interface assembly, when this predetermined time period (e.g., thirty seconds) expires as determined at decision block 604, it can be assumed that the central processing system has recognized the loss of communications. The interface assembly then transmits 606 a command to the CLRM to switch from the current communication link to the backup communication link, and transmits a command to reopen 608 the LAN connection. Based on these commands, the CLRM switches 610 from the current communication link to the backup communication link. An alarm relay may optionally be activated 612 to cause a trouble condition to occur at the control panel(s), thereby notifying the control panels of the situation.

In one embodiment the interface assembly will request that the CLRM switch back to the original (i.e., failed) communication link and attempt to establish communication after a time duration has expired. Such a time duration may be, for example, a one hour time duration. When the timer for such a time duration has expired as determined at decision block 614, the CLRM will switch 616 from the backup communication link to the original communication link. If communication is established within a predetermined time (e.g., one minute) as determined at decision block 618, this original communication link will remain active as shown at block 620, and the trouble condition may be cleared after the link has been successfully established for a predetermined time (e.g., five minutes). If communication is not established with the original communication link within the predetermined time, the CLRM will switch 622 the LAN connection back to the operable backup link.

Figure 7:
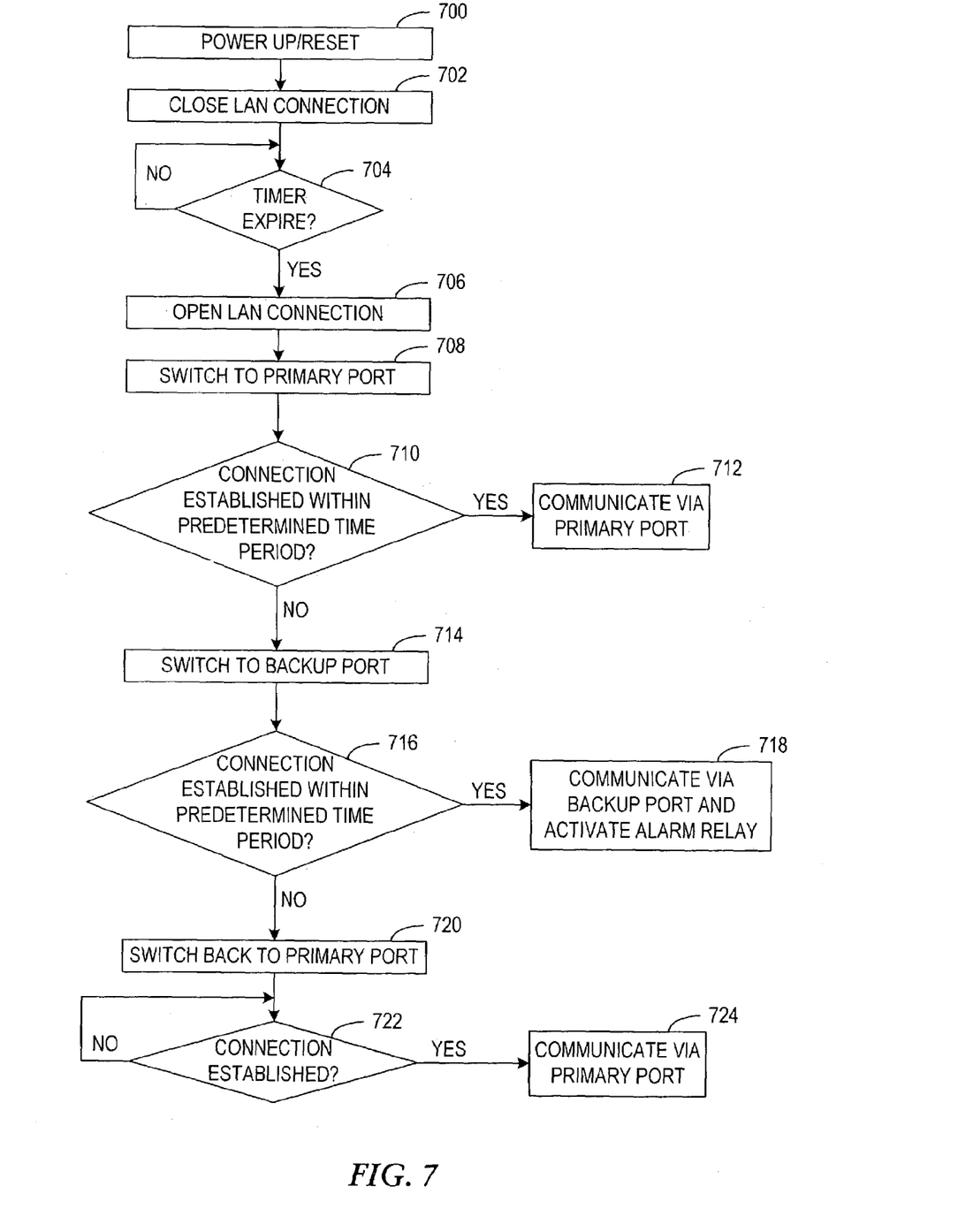
FIG. 7 is a flow diagram of a representative initialization process to initially establish an active communication link.

FIG. 7 is a flow diagram of a representative initialization process to initially establish an active communication link. A power up, microprocessor reset, or other reset condition occurs as shown at block 700. The LAN connection is closed 702 by the CLRM for a predetermined period, such as one minute, to ensure that the central processing system has detected the loss of interface communications. When this time period has elapsed as determined at decision block 704, the LAN connection is opened 706 and switched 708 to the primary port.

If it is determined 710 that a connection on the primary port is established within a predetermined period of time (e.g., one minute), communication will be effected via the primary port as shown at block 712. Whether communication is established may be determined by monitoring the DCD input from the terminal server, as previously described. If it is determined 710 that the connection on the primary port has not been established within the predetermined time period, the LAN connection is switched 714 to the backup port (or to one of a plurality of backup ports in the case of more than two total redundant communication links). If it is determined 716 that a connection on the backup port is established within a predetermined period of time (e.g., one minute), communication will be effected via the backup port, and the alarm may be activated if communication is established on the backup link as shown at block 718. Otherwise, the LAN connection switches 720 back to the primary port, and no further action is taken until the connection on the primary port has been detected as determined at decision block 722. When this occurs, communication is effected via the primary port as shown at block 724. Alternatively, establishing communication on either the primary or backup ports may be attempted at decision block 722, and establishing a communication link will result in communication via the respective link.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for maintaining communications on a safety system network connection, comprising:
   communicating a link integrity signal indicative of a communication state on a first network communication link;
   generating a control signal having characteristics corresponding to the communication state of the first network communication link, wherein the control signal characteristics are indicative of a short circuit between any two or more conductors associated with any of the first and second network communication links;
   controlling a communication link switch coupled to the first network communication link and one or more second network communication links in response to the control signal characteristics; and
   switching from the first network communication link to one of the second network communication links at the communication link switch if the control signal characteristics indicate a failure affecting any one or more signals associated with the first network communication link.

2. The method of claim 1, further comprising switching from a currently-active second network communication link to the first network communication link when the control signal characteristics indicate a failure affecting any one or more signals associated with the currently-active second network communication link.

3. The method of claim 1, further comprising switching from a currently-active second network communication link to another second network communication link when the control signal characteristics indicate a failure affecting any one or more signals associated with the currently-active second network communication link.

4. The method of claim 1, wherein the first network communication link comprises a primary communication link and the one or more second network communication links comprises a redundant communication link, and wherein switching from the first network communication link to one of the second network communication links comprises switching from the primary communication link to the redundant communication link if the control signal characteristics indicates a failure affecting any one or more signals associated with the primary communication link.

5. The method of claim 4, further comprising switching from the redundant communication link to the primary communication link if the control signal characteristics indicates a failure affecting any one or more signals associated with the redundant communication link.

6. The method of claim 1, wherein the network connection comprises an Ethernet connection, and wherein communicating a link integrity signal comprises communicating a link pulse signal via Ethernet technology between a central processing system and a terminal server to which the first and second network communication links are coupled.

7. The method of claim 6, wherein the link pulse signal comprises a Normal Link Pulse (NLP) used in a first Ethernet technology.

8. The method of claim 6, wherein the link pulse signal comprises a Fast Link Pulse (FLP) used in a second Ethernet technology.

9. The method of claim 6, wherein communicating a link pulse signal comprises periodically transmitting the link pulse signal.

10. The method of claim 1, wherein communicating a link integrity signal comprises exchanging link integrity messages between a central processing system and a terminal server over the first network communication link, wherein discontinuance of the exchange of the link integrity messages by one or both of the central processing system and the terminal server indicates a failure affecting any one or more signals associated with the first network communication link.

11. The method of claim 10, wherein communicating the link integrity signal comprises exchanging the link integrity messages between the central processing system and the terminal server over one of the second network communication links when the network connection has switched from the first network communication link to the respective second network communication link.

12. The method of claim 10, wherein exchanging link integrity messages comprises periodically transmitting the link integrity message from the central processing system to the terminal server, and periodically transmitting the link integrity message from the terminal server to the central processing system.

13. The method of claim 1, further comprising monitoring for a disruption of the link integrity signal at a terminal server caused by a failure affecting any one or more signals associated with a currently-active network communication link, and wherein generating a control signal comprises generating the control signal at the terminal server in response to recognizing the disruption of the link integrity signal.

14. The method of claim 1, further comprising:
suspending communication of the link integrity signal by a central processing system in response to the failure affecting any one or more signals associated with the first network communication link; and
monitoring for a disruption of the link integrity signal at a terminal server caused by the suspension of communication of the link integrity signal by the central processing system.

15. The method of claim 1, wherein controlling a communication link switch comprises:
monitoring the control signal characteristics of the control signal; and
generating a command for transmission to the communication link switch in response to the control signal characteristics, wherein the command dictates whether the communication link switch is to switch from the first network communication link to one of the second network communication links.

16. The method of claim 15, wherein the network connection is operating via one of the second network communication links, and wherein controlling the communication link switch further comprises:
monitoring the control signal characteristics of the control signal; and
generating a command to the communication link switch in response to the control signal characteristics, wherein the command determines whether the communication link switch is to switch from the second network communication link to the first network communication link or another of the second network communication links.

17. The method of claim 15, wherein generating a command for transmission to the communication link switch comprises generating and transmitting a series of command pulses for use in controlling the communication link switch.

18. The method of claim 17, wherein generating and transmitting a series of command pulses comprises periodically generating and transmitting the series of command pulses, and changing the series of command pulses to cause the communication link switch to switch from the first network communication link to one of the second network communication links when the control signal characteristics indicate a failure affecting any one or more signals associated with the first network communication link.

19. The method of claim 1, wherein the control signal characteristics are indicative of an open circuit of any one or more conductors associated with the first or second network communication links that is currently active.

20. A network interface for maintaining communication integrity with at least one central processor in a safety system, comprising:
a communication link redundancy module including a controllable link switch for activating one of a plurality of selectable communication links between the communication link redundancy module and the central processor;
a terminal server coupled to the link switch to communicate with the central processor via the currently-activated communication link, the terminal server comprising a link signal detector to monitor a link signal indicative of a communication state of the activated communication link and to generate a control signal in response thereto, wherein the communication state is indicative of a short circuit between any two or more conductors associated with the activated communication link; and an interface circuit coupled to the terminal server to receive the control signal, and to generate a command to the controllable link switch to select a different one of the plurality of selectable communication links when the control signal indicates a failure of any one or more signals associated with the currently-activated communication link.

21. The network interface as in claim 20, wherein the communication link redundancy module comprises at least a primary port and a backup port each coupled to one of the plurality of selectable communication links, and wherein the controllable link switch is coupled to the primary port and the backup port to select the selectable communication link associated with either the primary port or the backup port in response to the command from the interface circuit.

22. The network interface as in claim 20, wherein each of the plurality of selectable communication links comprise Ethernet communication links.

23. The network interface as in claim 22, wherein the communication link redundancy module and the terminal server each comprise Ethernet network interfaces to communicate information via the currently-activated communication link.

24. The network interface as in claim 20, wherein the terminal server and the interface circuit each comprise a serial communication port, and wherein the control signal from the terminal server is communicated to the interface circuit via the serial communication ports.

25. The network interface as in claim 24, wherein the commands generated at the interface circuit are communicated to the communication link redundancy module via the serial communication port of the interface circuit.

26. The network interface as in claim 25, wherein the serial communication port of the interface circuit comprises a Data Terminal Ready (DTR) conductor, and wherein the command is serially transmitted to the communication link redundancy module via the DTR conductor.

27. The network interface as in claim 24, wherein the serial communication ports of the terminal server and the interface circuit each comprise a Data Carrier Detect (DCD) conductor, and wherein the control signal is transmitted from the terminal server to the interface circuit via the DCD conductor.

28. The network interface as in claim 24, wherein the serial communication ports comprise RS-232 communication ports.

29. The network interface as in claim 20, wherein the interface circuit comprises a connection state monitor circuit to receive the control signal and to generate the command to the controllable link switch in response thereto.

30. The network interface as in claim 29, wherein the connection state monitor circuit comprises a software-controlled processor to monitor a state of the control signal, and to generate the command to the controllable link switch in response thereto.

31. The network interface as in claim 30, wherein the interface circuit comprises at least one timer circuit, and wherein a command is transmitted from the interface circuit to the controllable link switch upon each expiration of the timer circuit to select a different one of the plurality of selectable communication links as the currently-active communication link.

32. The network interface as in claim 31, wherein the interface circuit comprises a second timer circuit, wherein the command is retransmitted to the communication link redundancy module upon expiration of a second predetermined time duration determined by the second timer circuit, if a condition exists which temporarily prohibits the controllable link switch from selecting a different one of the plurality of selectable communication links.

33. The network interface as in claim 20, wherein the communication link redundancy module comprises control logic to demodulate the command from the interface circuit, and to control the controllable link switch in response to the demodulated command.

34. The network interface as in claim 33, further comprising an alarm relay to activate an alarm when the control signal indicates a failure of any one or more signals associated with the currently-activated communication link, and wherein the control logic is further configured to activate the alarm relay in response to the demodulated command if the demodulated command indicates a failure of any one or more signals associated with the currently-activated communication link.

35. The network interface as in claim 33, wherein the control logic further comprises at least one timer circuit to determine whether the command has been received within a predetermined time, and to activate an alarm relay to activate an alarm if the command has not been received within the predetermined time.

36. The network interface as in claim 33, wherein the communication link redundancy module comprises at least a primary port and a backup port each coupled to one of the plurality of selectable communication links, and wherein the control logic is further configured to selectively open and close the primary and backup ports in response to the command from the interface circuit.

37. A safety system, comprising:
(a) one or more control panels, each control panel coupled to one or more safety devices to control and/or monitor the safety devices;
(b) at least one central processing system to collect data from the one or more control panels; and
(c) a network interface module coupled to the control panels and the central processing system to facilitate communication therebetween, the network interface module comprising:
(i) a communication link redundancy module including a controllable link switch for activating one of a plurality of selectable communication links between the communication link redundancy module and the central processor;
(ii) a terminal server coupled to the link switch to communicate with the central processor via the currently-activated communication link, the terminal server comprising a link signal detector to monitor a link signal indicative of a communication state of the activated communication link and to generate a control signal in response thereto, wherein the communication state is indicative of a short circuit between any two or more conductors associated with the activated communication link; and
(iii) an interface circuit coupled to the terminal server to receive the control signal, and to generate a command to the controllable link switch to select a different one of the plurality of selectable communication links when the control signal indicates a failure of any one or more signals associated with the currently-activated communication link.

38. The safety system as in claim 37, wherein the safety devices comprise any one or more devices selected from the group comprising smoke detectors, heat detectors, fan controls, damper controls, pull stations, sprinkler devices, and fire pumps.

39. The safety system as in claim 37, wherein the control panels and the interface circuit each comprise a serial communication port to communicate information therebetween.

40. The safety system as in claim 37, further comprising a hub coupled between the network interface module and a network backbone on which the at least one central processing system is coupled, wherein the plurality of selectable communication links are coupled between the communication link redundancy module and the hub.

41. The safety system as in claim 37, wherein the communication link redundancy module at the network interface module comprises a master communication link redundancy module, and wherein the safety system further comprises a slave communication link redundancy module coupled between the master communication link redundancy module and the central processing system to couple the currently-activated communication link to the central processing module, and wherein the slave communication link redundancy module is configured to select the selectable communication link corresponding to the currently-activated communication link selected by the master communication link redundancy module.

42. A network interface for maintaining communication integrity with at least one central processor in a safety system, comprising:
   means for monitoring a link integrity signal indicative of a communication state on a first network communication link;
   means for generating a control signal having characteristics corresponding to the communication state of the first network communication link as indicated by the monitored link integrity signal, wherein the communication state is indicative of a short circuit between any two or more conductors associated with the first communication link;
   a communication link switch coupled to the first network communication link and one or more second network communication links; and
   means for controlling the communication link switch, in response to the control signal characteristics, to select one of the second network communication links if the control signal characteristics indicate a failure affecting any one or more signals associated with the first network communication link.

43. A network interface for maintaining communication integrity with at least one central processor in a safety system, comprising:
   a communication link redundancy module including a controllable link switch for activating one of a plurality of selectable communication links between the communication link redundancy module and the central processor;
   a terminal server coupled to the link switch to communicate with the central processor via the currently-activated communication link, the terminal server comprising a link signal detector to monitor a link signal indicative of a communication state of the activated communication link and to generate a control signal in response thereto;
   an interface circuit coupled to the terminal server to receive the control signal, and to generate a command to the controllable link switch to select a different one of the plurality of selectable communication links when the control signal indicates a failure of any one or more signals associated with the currently-activated communication link; and
   wherein the communication link redundancy module comprises control logic to demodulate the command from the interface circuit, and to control the controllable link switch in response to the demodulated command.

44. The network interface as in claim 43, further comprising an alarm relay to activate an alarm when the control signal indicates a failure of any one or more signals associated with the currently-activated communication link, and wherein the control logic is further configured to activate the alarm relay in response to the demodulated command if the demodulated command indicates a failure of any one or more signals associated with the currently-activated communication link.

45. The network interface as in claim 43, wherein the control logic further comprises at least one timer circuit to determine whether the command has been received within a predetermined time, and to activate an alarm relay to activate an alarm if the command has not been received within the predetermined time.

46. The network interface as in claim 43, wherein the communication link redundancy module comprises at least a primary port and a backup port each coupled to one of the plurality of selectable communication links, and wherein the control logic is further configured to selectively open and close the primary and backup ports in response to the command from the interface circuit.

* * * * *